(12) United States Patent
Chevance et al.

(10) Patent No.: US 6,473,462 B1
(45) Date of Patent: Oct. 29, 2002

(54) PROCESS FOR ESTIMATING A DOMINANT MOTION BETWEEN TWO FRAMES

(75) Inventors: Christophe Chevance, Rennes; Edouard François, Bourg des Comptes; Dominique Thoreau, Cesson-S˝vigné ; Thierry Viellard, Aeigne, all of (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/563,446

(22) Filed: May 1, 2000

(30) Foreign Application Priority Data

May 5, 1999 (EP) .............................. 99401077

(51) Int. Cl.⁷ ................................ H04N 7/36
(52) U.S. Cl. ................. 375/240.16; 348/699; 382/236
(58) Field of Search ............ 375/240.16; 348/699; 382/236; H04N 7/36

(56) References Cited

U.S. PATENT DOCUMENTS 5,802,220 A * 9/1998 Black et al. ............... 382/276
6,353,678 B1 * 3/2002 Guo et al. ................. 382/154

OTHER PUBLICATIONS

Alexander, M. E., et al., *The Registration of MR Images Using Multiscale Robust Methods*, Magnetic Resonance Imaging, 1996, Elesvier, USA, vol. 14, No. 5, pp.453–468, XP002119343 ISSN: 0730–725X.

Ziegler, M., *Hierarchical Motion Estimation Using the Phase Correlation Method in 140 MBIT/S HDTV–Coding*, Signal Processing of HDTV, 2, Turin, Aug. 30–Sep. 1, 1989, No. Workshop 3, Aug. 30, 1989 (189–08–30), pp. 131–137, XP000215234, Chiariglione L. p. 132–p. 133, Line 18.

Search Report.

* cited by examiner

Primary Examiner—Howard Britton
(74) Attorney, Agent, or Firm—Joseph S. Tripoli; Ronald H. Kurdyla; Joel M. Fogelson

(57) ABSTRACT

The process for estimating a dominant motion between two frames combines a phase correlation peak detection algorithm (1) and a multi-resolution robust regression algorithm (3) for improving the robustness of the estimation.

10 Claims, 2 Drawing Sheets

PROCESS FOR ESTIMATING A DOMINANT MOTION BETWEEN TWO FRAMES

FIELD OF THE INVENTION

The present invention relates to a process for estimating a dominant motion between two successive frames of a video sequence. This process is valid for all kind of scene or camera motion configuration.

BACKGROUND OF THE PRIOR ART

The estimation of the dominant motion is an important step for estimating or segmenting the apparent motion between two successive frames. In a dense motion field estimation, it strongly accelerates the process by providing an initial motion near the true apparent motion over a large part of the frame. This is especially the case when the dominant motion is not constant, that is not a pure translational apparent motion, but more complicated such as a zoom or a rotation around the optical axis of the camera. In a motion segmentation process, it represents a basic step for identifying the motion of a region, since it may be applied to the entire frame as well as regions of the frame.

The main commonly used approach for estimating the dominant motion between two successive frames is based on a robust regression method. It will be called in the following 'robust regression global motion estimation'. The main characteristics of this algorithm are the following:

- it uses a global motion model for representing the dominant motion with very few parameters. In most of cases, an affine motion model, which is a good compromise between the physical reality of the apparent motion and the computational complexity, is chosen. It may represent with a good approximation apparent motions resulting from camera motions such as traveling, pan, tilt, zoom, and any combination of these motions.
- the estimation of the parameters of this model is performed using a robust regression algorithm which theoretically allows the elimination of outliers, i.e. pixels having a different motion from the dominant motion, from the estimation process.
- this process may work without a prior dense motion field estimation. Data used for the global motion estimation process are the source frames. The process is based on the estimated spatio-temporal gradients of the luminance function at each pixel, through the well-known 'optic flow constraint'.
- this process may be achieved in a multi-resolution scheme, in order to deal with large motion amplitudes.

In many cases this type of algorithms provides satisfactory results, and is able to identify the dominant motion. However the process strongly depends on the initial value of the global motion. In general this global motion is set initially to zero. Moreover, there are many configurations where the estimation process fails and provides a wrong global motion. If the source frames are poorly textured and contain large uniform areas, the process generally converges toward a small amplitude motion, even if the real dominant motion is large. This phenomena is especially true when a large foreground object, tracked by the camera, moves over a background scene.

This problem can be easily explained: as said before, the 'motion' observations are based on the spatio-temporal gradients ; these observations are obviously very few informative on uniform or poorly textured areas. If such areas are majoritory in the frame, the algorithm cannot converge to a right motion value and it considers that a small motion well fits to the motion observations. It is an object of the present invention to solve the main limitations identified above.

SUMMARY OF THE INVENTION

The invention relates to a process for estimating the dominant motion between two frames. It combines a phase correlation peak detection algorithm and a multi-resolution robust regression algorithm for improving the robustness of the estimation.

BRIEF DESCRIPTION OF THE DRAWINGS

The invention will in the following be explained using examples to explicit some of its features and FIG. 1 and FIG. 2 wherein.

The phase correlation peak detection algorithm is a fast and efficient tool for estimating a global translational motion over a window between two frames. In the method described hereafter, it is used for providing potential initializations to the multi-resolution robust regression algorithm. For each initialization, this algorithm computes a global motion estimation. A final step consists of choosing the best estimation.

DETAILED DESCRIPTION OF PREFERRED EMBODIMENTS

Figure 1:
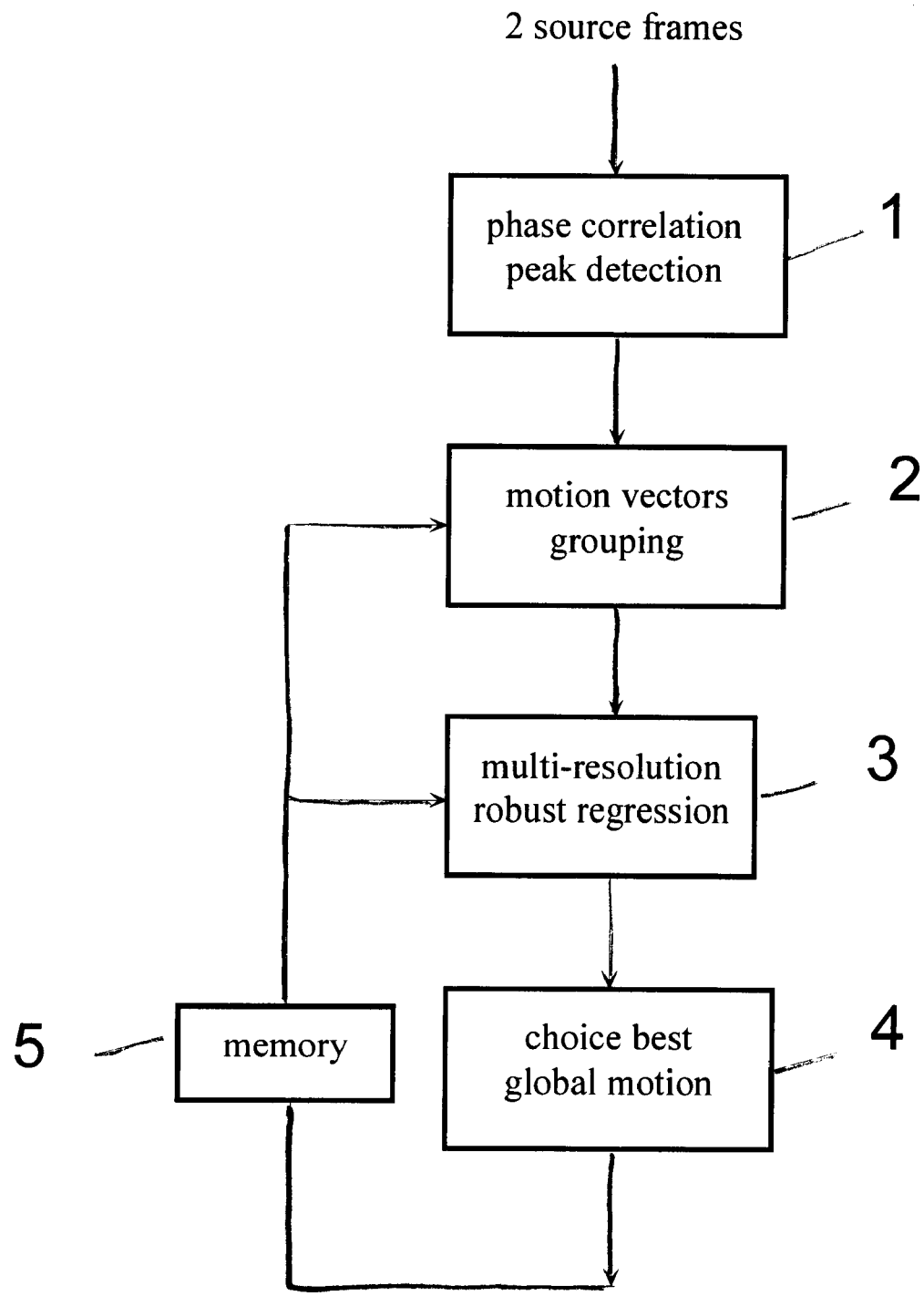
FIG. 1 is a flow chart of the dominant motion estimation algorithm
Figure 2:
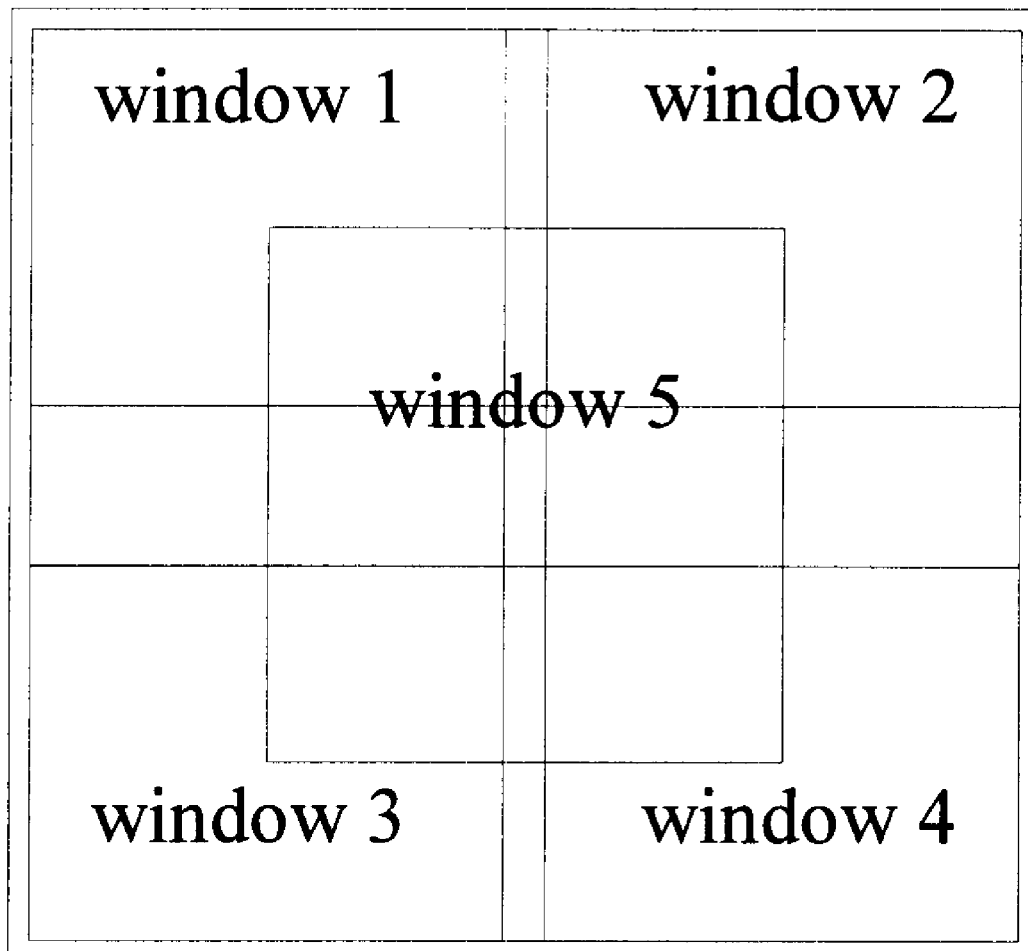
FIG. 2 is a view showing a disposition of different windows for the estimation of the translational motions The invention implements a generic global motion estimation process which works in most scene and camera configurations. This algorithm combines two global motion estimation methods, the phase correlation peak detection and the multi-resolution robust regression.

FIG. 1 is a flow chart representing the generic global motion estimation process implemented by the invention. Considering a time instant t and two source frames $I_t$ and $I_{t-1}$, the different steps of the process (identified with numbers 1 to 5 in FIG. 1) are:

Step 1: estimation of translational motions over several different windows within the frame, using the correlation peak detection algorithm; FIG. 2 shows emplacement of windows, in an example where five windows are used. A mobile window could also be used depending for instance on pixels areas where the global motion fits.

Step 2: translational motions are grouped if they are similar. P translational motion vectors are defined from the N translational motion vectors estimated during step 1 ($P \leq N$).

Step 3: estimation of global motions over the frame implementing the multi-resolution robust regression algorithm, using the different available initializations: the motion coming from each remaining translational motion vector, plus the previous final global motion estimated at the previous time (from frame $I_{t-2}$ to frame $I_{t-1}$) ; at the very first estimation, this global motion is set to zero.

Step 4: choice of the best estimated global motion.

This final dominant motion vector is memorised at step 5 as the previous dominant motion vector in order to be used, at step 2 and step 3, for the next source frames to be processed.

A detailed description of the global motion estimation process is given hereafter:

The affine modelization of the 2D apparent motion in a video sequence is one of the best compromises between the computation complexity (only 6 parameters have to be identified) and the physical reality (that is the correct representation of the 2D apparent motion).

Hence the motion model used here is the following. A 2D motion vector of a point (x,y) in the frame is modeled using six motion parameters $\theta=(a,b,\alpha,\beta,\gamma,\delta)^T$ in the following way:

$$\vec{\omega}_\theta(x, y) = \begin{pmatrix} dx \\ dy \end{pmatrix} = \begin{pmatrix} dx = a + \alpha \cdot x + \gamma \cdot y \\ dy = b + \beta \cdot x + \delta \cdot y \end{pmatrix} \quad \text{Equation 1}$$

A phase correlation peak detection algorithm is implemented at first step 1. The computation of phase correlation consists of the following successive phases:
- getting two pixel windows f1 and f2 which have the same sizes (n.m).
- the two-dimensional Fast Fourier Transform (FFT) is applied on the luminance components of each window resulting in two complex (n, m) element arrays F1 and F2.
- the phase difference matrix is derived by forming the cross power spectrum F1.F2 and dividing by its modulus.
- a weighting function of n.m dimension can be applied to the phase difference, in order to improve the phase correlation result. The goal of this procedure is to reduce the influence of noise which can disturb the correlation surface.
- Inverse Fourier Transform of the phase difference matrix gives the correlation surface with peaks for candidate displacements.
- Finally the search dominant vector operation consists of looking for the maximum peaks in the correlation surface which identifies the most dominant displacement.

A second step 2 performs a translational motion vectors grouping.

For each estimated translational motion vector $\vec{\omega}$ provided by the correlation peak detection algorithm applied to different windows within the frame, a first test is achieved:
- if the previous estimated dominant motion θ (previous frames) is translational, that is if $\alpha=\beta=\gamma=\delta=0$ and:
- if the euclidian distance between this dominant motion and $\vec{\omega}$ is lower than a given threshold, then $\vec{\omega}$ is suppressed of the list of translation vectors. In the same way, the remaining translational vectors are compared together using the euclidian distance. Redundant vectors are suppressed using the same test, with the same threshold. (The Euclidian distance between two vectors with components x1,y1 and x2, y2 is $\sqrt{(x1-x2)^2+(y1-y2)^2}$).

Next step 3 performs a multi-resolution robust regression algorithm.

In order to avoid the costly dense motion field estimation, which moreover can fail when large motions are present or in presence of strongly non-translational motions, the global motion estimation process is based on the spatio-temporal gradients of the frame luminance, which are linked to the 2D apparent motion by the well-known 'optic flow constraint equation':

$$dx.\Delta I_x + dy.\Delta I_y + \Delta I_t = 0 \quad \text{Equation 2}$$

where dx and dy are the two components of the motion vector, $\Delta I_x$, $\Delta I_y$ and $\Delta I_t$ are the spatio-temporal gradients of the luminance, that is, an estimation of the derivates of the luminance.

When dx and dy are replaced by their value depending on the global motion model, given in equation 1, this leads to the following equation:

$$(a-\alpha.x-\gamma.y).\Delta I_x+(b-\beta.x-\delta.y).\Delta I_y+\Delta I_t=0 \quad \text{Equation 3}$$

For estimating the global motion vector $\theta=(a,b,\alpha,\beta,\gamma,\delta)^T$ over the whole frame, a classical regression algorithm would intend to minimize over the 6 parameters of θ the following function:

$$\sum_{x,y} ((a - \alpha \cdot x - \gamma \cdot y) \cdot \Delta I_x(x, y) + (b - \beta \cdot x - \delta \cdot y) \cdot \Delta I_y(x, y) + \Delta I_t(x, y))^2$$

However, in case where several global motions are present in the frame, the process will be disrupted and would provide a wrong estimation. That is the reason why a robust regression algorithm is used. It theoretically allows to eliminate outliers, that is, pixels that do not have the same motion as the dominant one. This algorithm consists of minimizing the following function:

$$\sum_{x,y} wc(x, y)((a - \alpha \cdot x - \gamma \cdot y) \cdot$$

$$\Delta I_x(x, y)(+(b - \beta \cdot x - \delta \cdot y) \cdot \Delta I_y(x, y) + \Delta I_t(x, y)))^2$$

where wc(x,y) is a weighting function which intends to favour pixels for which the current global motion estimation well fits. Several functions may be chosen for wc (Lorentzian, Geman-Mc Lure, . . . ). The important point is that, in any case, this function depends on a scaling factor, related to the variance of the noise that corrupts the observations, and that must be correctly estimated for a good behaviour of the algorithm.

The estimation process is iterative. At each iteration k, the previous estimation $\hat{\theta}_{k-1}$ is used as initialization of the estimation process. In the same way, the scaling factor $\hat{\sigma}_k^2$ is iteratively estimated. Initially, $\hat{\sigma}_0^2$ is set to $5 \times R_0$, where $R_0$ is a given value. In all our experiments, $R_O$ was egal to 50. Then at each iteration, $\hat{\sigma}_k^2$ is computed as follows:

Let $\hat{V}_k^2$ be the mean weighted motion compensation error of the estimation over the frame:

$$\hat{V}_k^2 = \frac{\sum wc(x, y) \cdot \Delta I_t(x, y)^2}{\sum wc(x, y)} \quad \text{Equation 4}$$

The scaling factor is computed as:

$$\hat{\sigma}_k^2 = \min(0.66\, \hat{V}_k^2, \max(R_0, 0.8\, \hat{\sigma}_{k-1}^2)) \quad \text{Equation 5}$$

In order to be able to estimate large motions, the process is applied in a multiresolution way: a multiresolution pyramid of the two frames is firstly built; then the estimation process is applied from the coarsest to the finest resolution, by using as initial estimate of the motion parameters at a given level the estimation from the coarser level.

The initial global motion parameters vector is set to:
- the null vector if the process is just starting for the video shot,
- the previous value (that is the vector calculated from the previous resolution), rescaled by taking into account the higher resolution level, if the process is just starting for the current frame.

Then an iterative process is applied. Let k be the current iteration number. From the current estimation of the motion parameters vector $\hat{\theta}_{k-1}$, a motion compensation of the previous frame is achieved, and the spatio-temporal gradients maps are computed. The continuation of this process consists of progressively correcting the first estimate of θ until this correction becomes low. The robust regression at each iteration provides a correcting motion parameters vector $d\hat{\theta}_k$. The global motion parameters vector is then up-dated:

$$\hat{\theta}_k = \hat{\theta}_{k-1} + d\hat{\theta}_k$$

The process is iterated until the amplitude of the estimated global motion parameters correction becomes lower than a given threshold. The resulting motion parameters vector $\hat{\theta}$ is considered as the robust estimation of the dominant motion parameters vector.

Next step 4 allows to choose the best global motion vector. During the robust regression process, the final variance over the dominant motion support, that is, parts of the frame where the dominant motion fits, is computed as follows. First, inlier pixels (where the dominant motion fits) are determined by the following test:

if $\Delta I_f(x,y)^2 < 4\hat{\sigma}_P^2$ then the pixel is an inlier where P is the final iteration number of the estimation process.

Then the final variance is computed as the mean of $\Delta I_f(x,y)^2$ over the inliers set.

The best global motion vector is chosen as the vector that provides the minimum final variance.

What is claimed is:

1. A process for estimating a dominant motion between two frames, characterized in that it combines a phase correlation peak detection algorithm (1) and a multi-resolution robust regression algorithm (3) for improving the robustness of the estimation.

2. The process according to claim 1, characterised in that the phase correlation peak detection algorithm (1) is implemented on several different windows to provide translational motion vectors as initializations to the multi-resolution robust regression algorithm.

3. The process according to claim 2, characterized in that the phase correlation peak detection algorithm estimates the translational motions on at least one mobile window.

4. The process according to claim 2, characterized in that a motion vector grouping (2) is performed according to their Euclidean distance.

5. The process according to claim 4, characterized in that a comparison is carried out (2) between the dominant motion calculated for a previous frame and the translational motion vectors.

6. The process according to claim 1, characterized in that the robust regression algorithm (3) carries out a weighting function favouring pixels for which the current global motion estimation well fits.

7. The process according to claim 6, characterized in that the weighting function depends on a scaling factor computed at each iteration and related to the variance of the noise.

8. The process according to claim 1, characterized in that the selection of the best estimated motion (4) is the one giving the minimum final variance.

9. The process according to claim 8, characterized in that the variance is only calculated on the dominant motion support.

10. The process according to claim 1, characterized in that the estimation is a multiresolution motion estimation.

* * * * *